(12) United States Patent
Sankaranarayanan et al.

(10) Patent No.: US 10,558,521 B2
(45) Date of Patent: Feb. 11, 2020

(54) SYSTEM AND METHOD FOR PROVIDING PREDICTIVE FAILURE DETECTION ON DDR5 DIMMS USING ON-DIE ECC

(71) Applicant: DELL PRODUCTS, LP, Round Rock, TX (US)

(72) Inventors: Vadhiraj Sankaranarayanan, Austin, TX (US); Stuart Allen Berke, Austin, TX (US); Andrew Butcher, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/443,537

(22) Filed: Feb. 27, 2017

(65) Prior Publication Data

US 2018/0246775 A1 Aug. 30, 2018

(51) Int. Cl.
*G06F 11/07* (2006.01)
*G06F 11/10* (2006.01)
*G06F 11/00* (2006.01)

(52) U.S. Cl.
CPC ................ *G06F 11/1048* (2013.01)

(58) Field of Classification Search
None
See application file for complete search history.

(56) References Cited

U.S. PATENT DOCUMENTS

| | | | |
|---|---|---|---|
| 6,819,577 B1 | 11/2004 | Wiktor et al. | |
| 7,117,421 B1* | 10/2006 | Danilak | G06F 11/1008 714/763 |
| 7,368,959 B1 | 5/2008 | Xu et al. | |
| 8,489,775 B2 | 7/2013 | Berke et al. | |
| 9,747,148 B2* | 8/2017 | Healy | G06F 11/0766 |
| 2012/0023262 A1 | 1/2012 | Berke et al. | |
| 2014/0281661 A1* | 9/2014 | Milton | G06F 11/1458 714/2 |
| 2016/0118121 A1 | 4/2016 | Kelly et al. | |
| 2016/0224412 A1* | 8/2016 | Healy | G06F 11/1008 |

OTHER PUBLICATIONS

U.S. Appl. No. 15/331,064, filed Oct. 21, 2016.
U.S. Appl. No. 15/276,240, filed Sep. 21, 2016.
XED: Exposing On-Die Error Detection Information for Strong Memory Reliability, Prashant J. Nair et al., ISCA-43, Jun. 20, 2016, pp. 1-13.

* cited by examiner

*Primary Examiner* — Justin R Knapp
(74) *Attorney, Agent, or Firm* — Larson Newman, LLP

(57) ABSTRACT

An information handling system includes a memory controller and a Dual In-Line Memory Module (DIMM) including a Dynamic Random Access Memory (DRAM) device. The DRAM device is configured to detect an Error Correcting Code (ECC) bit error for a data transaction within the DRAM device, determine if the ECC bit error results in an ECC error threshold being exceeded, and provide an alert signal to the memory controller in response to determining that the ECC bit error resulted in the ECC error threshold being exceeded.

20 Claims, 3 Drawing Sheets

SYSTEM AND METHOD FOR PROVIDING PREDICTIVE FAILURE DETECTION ON DDR5 DIMMS USING ON-DIE ECC

FIELD OF THE DISCLOSURE

This disclosure generally relates to information handling systems, and more particularly relates to providing predictive failure detection on DIMMs using on-die ECC.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory controller and a Dual In-Line Memory Module (DIMM) including a Dynamic Random Access Memory (DRAM) device. The DRAM device may be configured to detect an Error Correcting Code (ECC) bit error for a data transaction within the DRAM device, determine if the ECC bit error results in an ECC error threshold being exceeded, and provide an alert signal to the memory controller in response to determining that the ECC bit error resulted in the ECC error threshold being exceeded.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
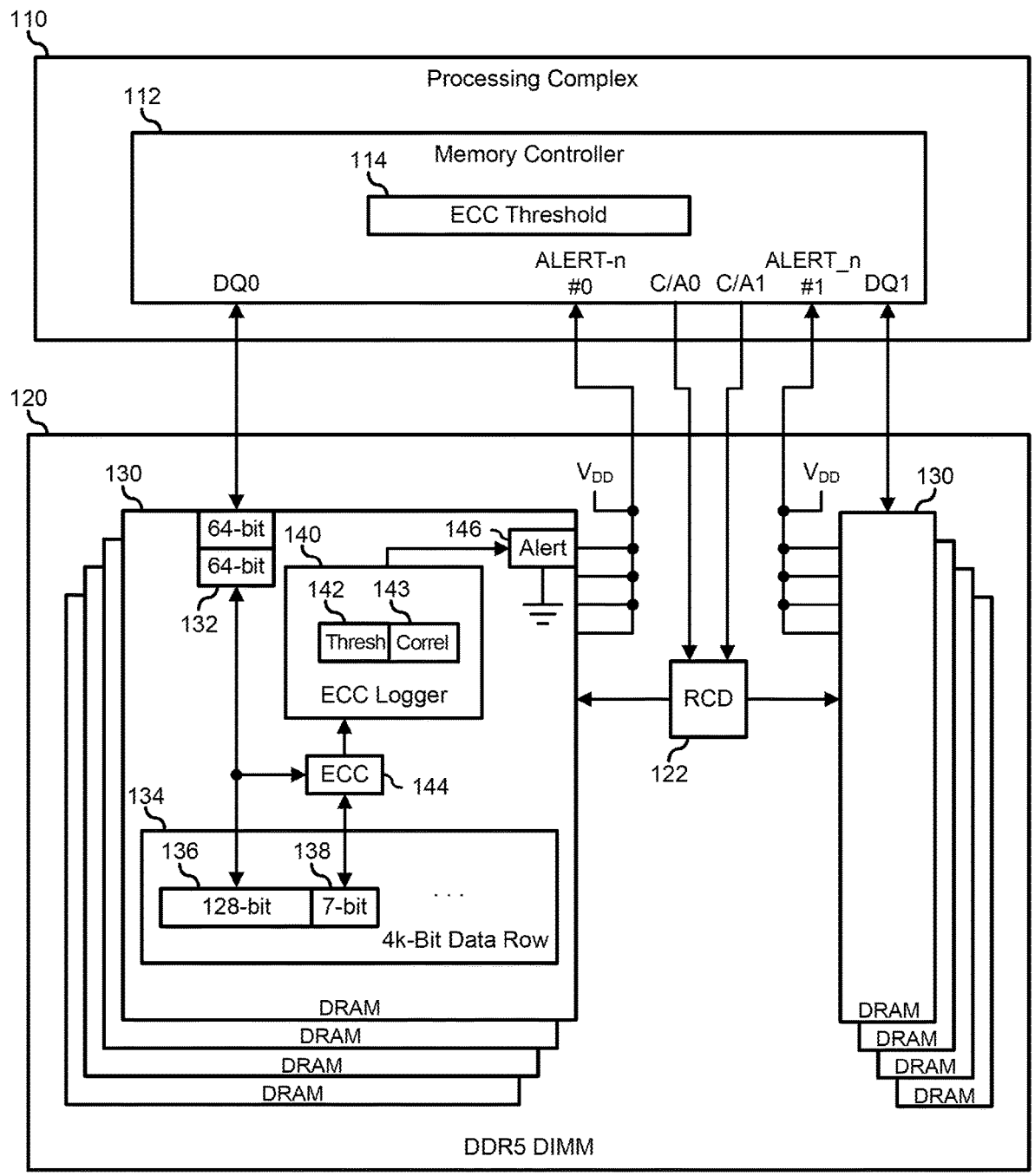
FIG. 1 is a block diagram illustrating an information handling system that has a two-channel DDR5 architecture, and that includes DDR5 DRAM devices that provide predictive failure detection using on-die ECC according to an embodiment of the present disclosure.

FIG. 1 illustrates an embodiment of an information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system can 100 also include one or more buses operable to transmit information between the various hardware components.

Fifth generation Double Data Rate (DDR5) Dual In-Line Memory Modules (DIMMs) may provide higher data transfer rates and greater DIMM densities than are available with the preceding DDR generations. However, the Dynamic Random Access Memory devices (DRAMs) have tighter internal timing requirements, smaller process feature geometries, and greater densities. As such, the DRAMs that provide the data storage on the DDR5 DIMMS may be prone to greater data retention and access failure rates. As such, DDR5 DRAM devices may include on-die Error Correcting Code (ECC) capabilities.

Information handling system 100 includes a processing complex 110 and a fifth generation Dual Data Rate (DDR5) Dual In-Line Memory Module (DIMM) 120. Information handling system 100 is implemented as a two-channel DDR5 architecture, and is configured to utilize DIMMs with DRAM devices that each operate to provide an indication when a number of Error Correcting Code (ECC) errors on the DRAM device exceeds a user programmable ECC threshold, or when the rate at which ECC errors occur exceeds a user programmable ECC rate threshold. Each DRAM device in a particular DDR5 channel is connected together to provide an alert signal, such as a DDR5 standard ALERT_n signal, to a memory controller of information handling system 100 when that DRAM device detects an excess of ECC errors or a high ECC rate. In a particular embodiment, ALERT_n signals from all of the DRAMs of DDR5 DIMM 120 are wired together in a wired-OR configuration, using an open-drain with pull-up topology, or another suitable topology, as needed or desired. The ECC threshold or ECC rate threshold are programmable by the memory controller with values set by system management defaults or by user specification.

When the memory controller detects the assertion of the ALERT_n signal on one of the DDR5 channels, and determines that the ALERT_n signal was asserted by a DRAM device in response to detecting an excess of ECC errors or a high ECC rate, the memory controller can initiate various steps to prevent correctable on-die ECC errors from evolving into crippling uncorrectable system level errors that may affect the operation of information handling system 100. For example, the memory controller can reduce a data transfer rate on the DDR5 channel associated with the DRAM device that asserted the ALERT-n signal, can isolate the DDR5 channel, or can prompt the DRAM device to perform a Post-Package Repair (PPR) on a particular row of the DRAM device. The memory controller can maintain a history of the assertions of the ALERT_n signal for logging ECC errors, and can utilize the history to set the threshold in the DRAM devices, and can perform various statistical analysis on the history to predict failures of a particular row of the DRAM device, of a particular DRAM device, of a DDR5 channel, or of DIMM 120.

Processing complex 110 includes a hardware memory controller 112, and the memory controller includes an ECC threshold setting 114. Processing complex 110 represents the hardware, software, firmware, and other elements associated with the performance of the processing tasks associated with information handling system 100. As such, processing complex 110 may be understood to include one or more data processors or processing cores, one or more input/output (I/O) devices such as processor, memory, or I/O controller hub, system memory including random access memory (RAM) and system read-only memory (ROM), mass data storage devices, video processors, network interface devices, or other devices typical to an information handling system, as needed or desired. Memory controller 112 represents a device of processing complex 110 that manages the flow of data going to and from DIMM 120. Memory controller 112 is configured to implement a two-channel DDR5 architecture. As such, memory controller 112 is connected to DIMM 120 via two DDR5 channels (channels 0 and 1). Each channel includes a data bus (DQ0 and DQ1) and a command/address bus (C/A0 and C/A1), and is configured to receive an ALERT_n signal (ALERT_n #0 and ALERT_n #1). ECC threshold setting 114 is utilized by memory controller 110 to evaluate the occurrence of FCC error related assertions of the ALERT_n signal, and to determine an appropriate ECC threshold or ECC rate threshold to provide to the DRAM devices, as described further, below. In a particular embodiment, ECC threshold setting 114 includes separate settings for each DIMM, for each channel, for each DRAM device on each DIMM, or for other memory organizations, as needed or desired. In this way, memory controller 112 can assert greater control over the received ALERT_n signals, by, for example, increasing a threshold for a known problem DRAM device that is already otherwise being mitigated. Note that, as shown, each of channels 0 and 1 include separate ALERT_n signal inputs, but this is not necessarily so, and a single ALERT-n signal may be provided for all DRAMs on DIM 120, as needed or desired.

DIMM 120 represents a fifth generation DDR DIMM with two separate channels for communicating with memory controller 112. An example of a fifth generation DDR DIMM includes an unbuffered DIMM (UDIMM), a registered DIMM (RDIMM), a load reduced DIMM (LRDIMM), a storage class memory (SCM), or another type of fifth generation DIMM. DIMM 120 includes a Register Control Device (RCD) 122, and Dynamic Random Access Memory (DRAM) devices 130. DIMM 120 is illustrated herein as including RDC 122, and the functions and features of operation of the DIMM are illustrated and described within the context of a RDIMM, but this is not necessarily so, and the skilled artisan will understand that the functions and features of operation of a DIMM as described herein may be provided in other ways, such as by a Programmable Logic Device (PLD), as needed or desired by the particular design of the DIMM. RCD 122 is connected to command/address bus C/A0 and to command/address bus C/A1 to receive command and address information from memory controller 112 for DDR5 channel 0 and DDR5 channel 1, respectively. RCD 122 is also connected to DRAM devices 130 to provide the command and address information to the DRAM devices. DRAM devices 130 are connected to data bus DQ0 and to data bus DQ1 to transfer data between the DRAM devices and memory controller 112. Data bus DQ0 and data bus DQ1 each represents a 40-bit wide communication path to carry 32-bits of memory data, and 8-bits of Error Correcting Code (ECC) data.

In normal operation, memory transactions for memory locations associated with DRAMs 130 are conducted on one of DDR5 channel 0 or DDR5 channel 1. For example, a memory read to a memory location associated with DRAMs 130 on DDR5 channel 0 will start with memory controller 112 presenting command and address information on command/address bus C/A0. RCD 122 will provide the command and address information to DRAMs 130 on DDR5 channel 0, and the DRAMs will provide the read data from the addressed memory location to memory controller 112 on data bus DQ0. In another example, a memory write to a memory location associated with DRAMs 130 on DDR5 channel 1 will start with memory controller 112 presenting command and address information on command/address bus C/A1 and the write data on data bus DQ1. RCD 122 will provide the command and address information to DRAMs 130 on DDR5 channel 1 and the DRAMs will read the data from DQ1 and store the data to the addressed memory location.

Each DRAM device 130 includes data buffers 132, data rows 134, an ECC logger 140 with an ECC threshold register 142, a data ECC checker and corrector 144, and alert logic 146. Data buffers 132 are connected to data bus DQ0 to receive write data from memory controller 112 and to provide read data to the memory controller. Data buffers 132 are configured to store and retrieve data from data rows, based upon whether command information received on command/address bus C/A0 indicates whether a memory transaction is a memory write transaction or a memory read transaction. Data rows 134 represent the addressable data storage capacity of DRAM device 130, and the data stored or retrieved by data buffers 132 is directed to a particular data row based upon address information received on command/address bus C/A0. In a particular embodiment, transactions on DDR5 channel 0 and DDR5 channel 1 consist of a burst of 16 data writes or data reads. Thus, assuming that a DRAM device 130 is a 4-bit device, then a burst write or burst read will utilize a 64-bit data buffer. DRAM device 130 is configured such that data stored in storage rows 134 are stored 128-bits at a time, such as to a data storage location 136 in the storage rows. As such, data buffers 132 are illustrated as consisting of two 64-bit data buffers. As illustrated, data rows 134 each store 4 k-bits of data, or 32 (=$2^5$) data storage locations similar to data storage location 136. The skilled artisan will recognize that other memory configurations and data handling schemes may be utilized as needed or desired. It will be understood that henceforth, where a function or feature of a DRAM device is described, the function or feature is present on each of the other DRAM devices of DIMM 120, and that where a function or feature is described with respect to one of DDR5 channel 0 and DDR5 channel 1, that the function or feature is mirrored on the other DDR5 channel, unless otherwise noted.

In addition to storing and retrieving data from data storage location 136, each transaction between data buffers 132 and the data storage location is assured to communicate the data correctly by the addition of data ECC checker and corrector 144 which operates to calculate seven bits of ECC data with each 128-bit write to data storage location 136, and to store the ECC data to a 7-bit ECC storage location 138 associated with each data storage location of data rows 134. Data ECC checker and corrector 144 also operates to read the seven bits of ECC data from ECC storage location 138 with each read from data storage location 136, and to determine if there are any bit errors in the data from the data storage location and the ECC storage location. In a particular embodiment, data ECC checker and corrector 144 is configured to correct single-bit errors in the data from data storage location 136 and ECC storage location 138, and to detect two-bit errors. The skilled artisan will recognize that other ECC schemes may be used to assure the internal storage integrity and transmission of data stored on a DRAM device, as needed or desired.

When data ECC checker and corrector 144 detects ECC errors in the data stored in data rows 134 in response to a memory read transaction, the data ECC checker and corrector provides an error signal to ECC logger 140. ECC logger 140 operates to compile information related to ECC errors, including the number of ECC errors detected and a rate at which ECC errors are detected. ECC logger 140 also operates to obtain correlation information that relates the ECC errors to the particular data storage location 136 and ECC storage location 138, to the particular data rows 134, or to other data structures included on DRAM device 130, and to store the correlation information for later retrieval and analysis in correlation information storage 143. Finally, ECC logger 140 operates to provide an alert indication to alert logic 146 to provide an ALERT_n signal to memory controller 112 when an ECC error count exceeds an ECC error threshold or when an ECC error rate exceeds an ECC error rate threshold, as provided by an ECC threshold register 142 in the ECC logger. Thus, in a particular embodiment ECC threshold register 142 represents a storage location for storing a reference value for one or more of an ECC error threshold or an ECC error rate threshold.

Alert logic 146 receives the internal alert indication from ECC logger 140 and asserts the ALERT_n signal to memory controller 112 by pulling a normally logic high state ALERT_n #0 bus to a logic low state by connecting the ALERT_n #0 bus to a ground plane of DIM 120. The ALERT_n signal is thus a logic low signal. The ALERT_n #0 bus is connected to an ALERT_n # pin of all of the DRAM devices 130 associated with DDR5 channel 0 in a wired-OR configuration, where the ALERT_n #0 bus is normally pulled to the logic high state, such as via a pull-up resistor connected between a $V_{DD}$ plane of DIMM 120 and the ALERT_n #0 bus. As such, one or more of DRAM devices 130 can simultaneously assert their respective ALERT_n # pins, and memory controller 122 is, by virtue of the assertion of the ALERT_n signal alone, not able to distinguish which one of the DRAM devices has asserted its ALERT_n # pin. Thus, when memory controller 112 detects the ALERT_n signal on the ALERT_n #0 bus, the memory controller will poll each of the DRAM devices 130 on DDR5 channel 0 to determine which one or more of the DRAM devices asserted the ALERT_n signal, and to determine the reason for asserting the ALERT_n signal.

When memory controller 112 determines that a particular DRAM device 130 has asserted the ALERT_n signal due to an indication from ECC logger 140 that an ECC threshold has been exceeded, then the memory controller initiates a transaction with DIMM 120 to determine the nature of the ECC errors that cause the assertion of the ALERT_n signal. In particular, memory controller 112 operates to read the contents of correlation information storage 143 to determine the particular data storage location 136 and ECC storage location 138, the particular data rows 134, or other data structures included on DRAM device 130 that were the source of the ECC errors.

Memory controller 112 ECC also operates to provide the value for one or more of an ECC error threshold or an ECC error rate threshold from ECC threshold setting 114 to ECC threshold register 142 in order to control the frequency at which the memory controller receives ALERT_n signals related to ECC errors. For example, memory controller 112 can determine a desired ECC error threshold or ECC error rate threshold, can store the desired information in ECC threshold setting 114, and can provide the information to DRAM device 130 for use in determining when to provide the alert indication to alert logic 146. In a particular embodiment, one or more of the ECC error threshold and the ECC error rate threshold are provided as a number, above which an error indication is triggered in ECC logger 140. In another embodiment, ECC threshold register 142 is configured to provide multiple options for selectable ECC error rates, where the error rates for DRAM device 130 have been predetermined by a manufacturer of the DRAM device. Note that the communication between memory controller 112 and DRAM devices 130 may be performed in various ways, as are known in the art, such as by reading one or more mode register of RCD 132, by communicating with DIMM 130 through the DIMM's Serial Presence Detect (SPD) logic via an I2C interface, by accessing the DRAM device's Mode Register Set (MRS) registers, or via another communication method, as needed or desired. The particulars of reading and writing information between a memory controller and a RCD, or between the memory controller and DRAM devices is known in the art, and will not be further discussed herein, except as necessary to clarify the scope of the present disclosure.

When memory controller 112 determines that the ALERT_n signal was asserted by DRAM device 130 in response to detecting an excess of ECC errors or a high ECC error rate, the memory controller can initiate various steps to prevent correctable on-die ECC errors from evolving into crippling system level errors that may affect the operation of information handling system 100. For example, memory controller 112 can reduce a data transfer rate on DDR5 channel 0, can isolate DDR5 channel 0, or can prompt DRAM device 130 to perform a Post-Package Repair on a particular row of the DRAM device based upon the correlation information stored in correlation information storage 143. In a particular embodiment, memory controller 112 maintains a history of the assertions of the ALERT_n signal for ECC errors, and utilizes the history to set one or more of an ECC error threshold and an ECC error rate threshold in DRAM devices 130. In particular, memory controller 112 operates to perform various statistical analysis on the history to predict failures of a particular data row of DRAM device 130, of the particular DRAM device, of a DDR5 channel, or of DIMM 120. For example, memory controller 112 can aggregate the correlation information retrieved from correlation information storage 143 based upon storage location, data row, DRAM device, DDR5 channel, DIMM, or based upon another memory organization of information handling system 100. Memory controller 112 can then perform a pareto analysis on the aggregated correlation information to identify worst case elements of the DIMMs on information handling system 100, and can determine a likelihood of failure of one or more of the elements of the DIMMs. In a particular case, trending can also be analyzed by memory controller 112. For example, memory controller 112 can determine that a rate of ECC errors that occur on a particular element of the DIMMs is worsening, and can take steps to isolate the particular element, such as by transferring data stored at the particular element to another storage device, and remapping the data on processing complex 110.

Memory controller 112 also operates to dynamically determine ECC error thresholds and ECC error rate thresholds based upon the statistical analysis of the correlation information. For example, memory controller 112 can keep track of the age of DIMMs in information handling system 100 and can increase one or more of the ECC error threshold and the ECC error rate threshold to account for the likely increase in the overall number of ECC errors or an expected increase in the ECC error rate of a DIMM over time. In this way, memory controller 112 can keep the number of received ALERT_n signal to a minimum level needed to detect significant events and to eliminate unnecessary noise in the receipt of ALERT_n signals. In a particular embodiment, ECC threshold setting 114 includes separate settings for each DIMM, for each channel, for each DRAM device on each DIMM, or for other memory organizations, as needed or desired. In this way, memory controller 112 can assert greater control over the received ALERT_n signals, by, for example, increasing a threshold for a known problem DRAM device that is already otherwise being mitigated. The skilled artisan will understand that, one or more of the functions and features of memory controller 112, as described above, may be performed at a higher logic level of information handling system 100, such as by a platform BIOS or uEFI, a system OS, an application or API, or the like, as needed or desired.

Figure 2:
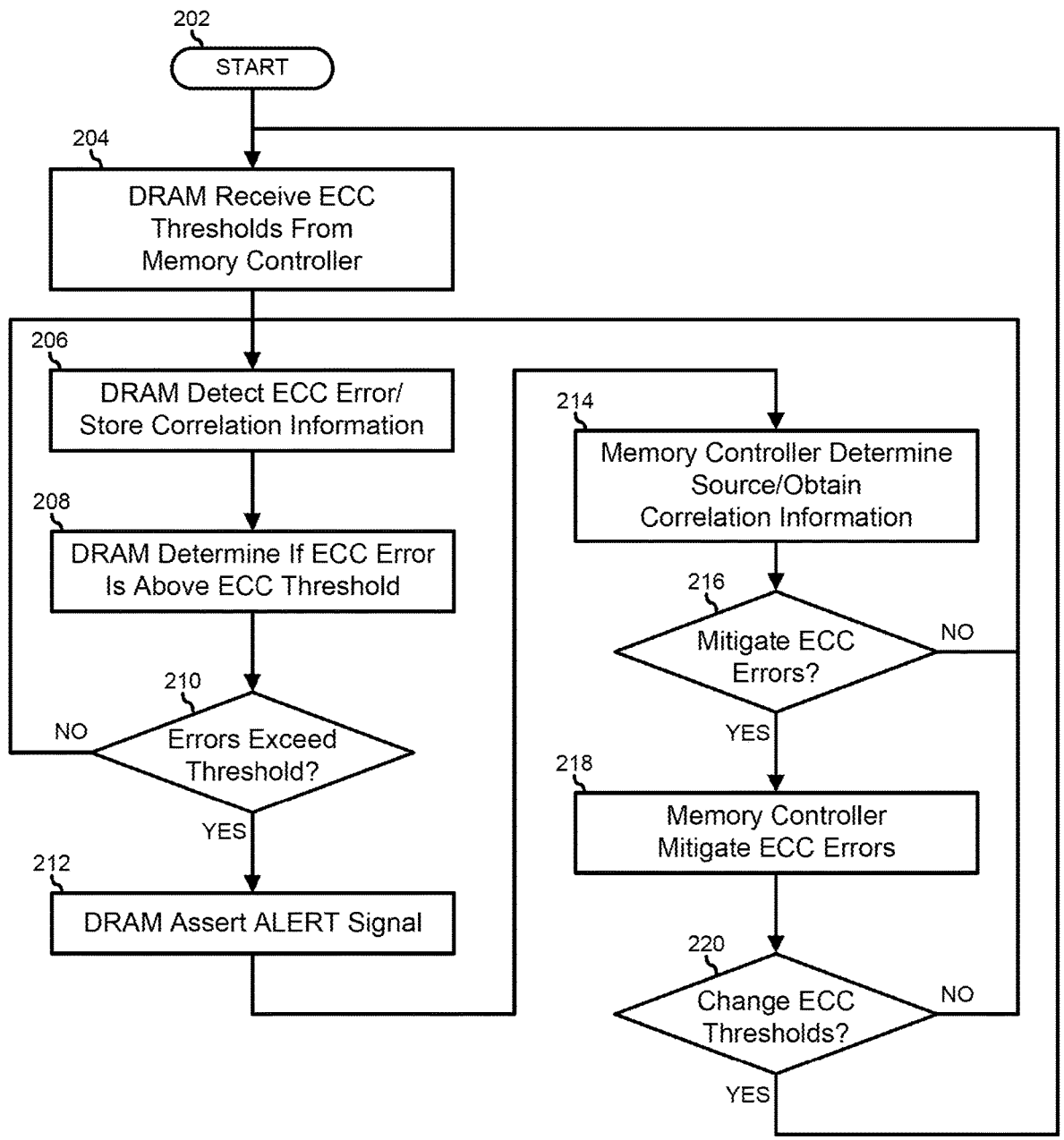
FIG. 2 is a flowchart illustrating a method of utilizing on-die ECC in DDR5 DRAM devices for predictive failure detection in DDR5 DIMMs according to an embodiment of the present disclosure.

FIG. 2 illustrates a method of utilizing on-die ECC in DDR5 DRAM devices for predictive failure detection in DDR5 DIMMs, starting at block 202. DRAM devices of one or more DIMMs on an information handling system receive one or more of an ECC error threshold and an ECC error rate threshold from a memory controller of the information handling system in block 204. For example, memory controller 112 can provide one or more of an ECC error threshold and an ECC error rate threshold in ECC threshold setting 114, and can send the thresholds to ECC threshold register 142 in DRAM device 130. The DRAM devices detect ECC bit errors on data being read from the memory storage array of the DRAM devices and provide an ECC error indication, and correlation information is stored that relates to the ECC bit errors in block 206. For example, data ECC checker and corrector 144 can operate to correct single-bit errors and to detect two-bit errors during reads from data storage location 136. When data ECC checker and corrector 144 detects ECC errors, the ECC error signal can be provided to ECC logger 140, and the correlation information can be stored to correlation information storage 143. The each DRAM device determines if detected ECC errors result in an ECC error count being above an ECC error threshold, or in an ECC error rate being above an ECC error rate threshold in block 208. For example, ECC error register 142 can include one or more of an ECC error threshold and an ECC error rate threshold, and ECC logger 140 can determine if received ECC error signals result in an ECC error count being above the ECC error threshold, or in an ECC error rate being above the ECC error rate threshold. A decision is made as to whether or not the detected ECC errors result in an ECC error count being above an ECC error threshold, or in an ECC error rate being above an ECC error rate threshold in decision block 210. If not, the "NO" branch of decision block 210 is taken and the method returns to block 206 where the DRAM devices detect ECC bit errors.

If the detected ECC errors result in an ECC error count being above an ECC error threshold, or in an ECC error rate being above an ECC error rate threshold, the "YES" branch of decision block 210 is taken and the DRAM device asserts an ALERT_n signal to a memory controller in block 212. For example, when ECC logger 140 detects that an ECC threshold has been exceeded, the ECC logger can direct alert logic 146 to send the ALERT_n signal to memory controller 112 via the ALERT_n #0 bus. The memory controller determines the source DRAM device that asserted the ALERT_n signal, and retrieves the correlation information from the DRAM device in block 214. For example, memory controller 112 can poll each of DRAM devices 130 on DDR5 channel 0 to determine which one or more of the DRAM devices asserted the ALERT_n signal, and can retrieve the correlation information from the DRAM devices. A decision is made as to whether or not the memory controller should take steps to mitigate the ECC errors on the DIMMs in decision block 216. If not, the "NO" branch of decision block 216 is taken and the method returns to block 206 where the DRAM devices detect ECC bit errors.

If the memory controller should take steps to mitigate the ECC errors on the DIMMs, the "YES" branch of decision block 216 is taken and the memory controller mitigates the effects of the ECC errors in block 218. For example, memory controller 112 can reduce a data transfer rate on DDR5 channel 0, can isolate DDR5 channel 0, or can prompt DRAM device 130 to perform a Post-Package Repair on a particular row of the DRAM device based upon the correlation information stored. A decision is made as to whether or not one or more of the ECC error threshold and the ECC error rate threshold should be modified in decision block 220. If not, the "NO" branch of decision block 220 is taken and the method returns to block 206 where the DRAM devices detect ECC bit errors. If one or more of the ECC error threshold and the ECC error rate threshold should be modified, the "YES" branch of decision block 220 is taken and the method returns to block 204 where the DRAM devices receive one or more of the modified ECC error threshold and the modified ECC error rate threshold.

Figure 3:
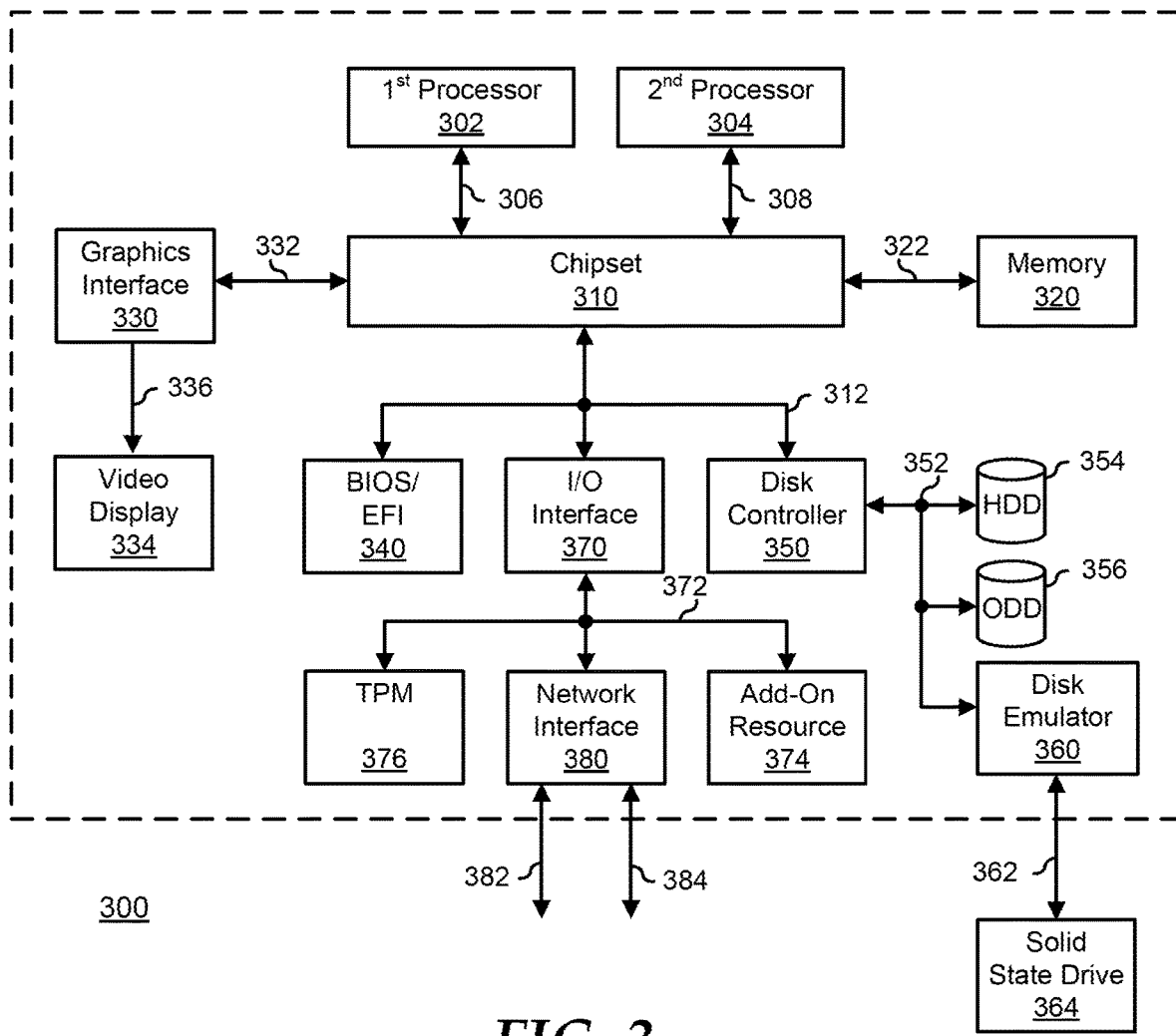
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents an NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a memory controller configured to provide a first memory channel and a second memory channel; and
a dual-channel Dual In-Line Memory Module (DIMM) including a first Dynamic Random Access Memory (DRAM) device coupled to the first memory channel, and including a second DRAM device coupled to the second memory channel, the first DRAM device configured to receive a first Error Correcting Code (ECC) error threshold from the memory controller, and the second DRAM device configured to receive a second ECC threshold from the memory controller;
the first DRAM device further configured to:
detect a first ECC bit error for a data transaction within the first DRAM device;
determine if the first ECC bit error results in the first ECC error threshold being exceeded; and
provide an alert signal to the memory controller in response to determining that the first ECC bit error resulted in the first ECC error threshold being exceeded;
wherein in response to receiving the alert signal from the first DRAM device, the memory controller is configured to:
retrieve first correlation information from the first DRAM device, wherein the first correlation information includes a first storage location associated with the first ECC bit error; and
mitigate errors on the first DRAM device based upon the correlation information.

2. The information handling system of claim 1, wherein the first DRAM device is further configured to:
store the first correlation information associated with the first ECC bit error.

3. The information handling system of claim 2, wherein the first correlation information comprises a first storage location associated with the first ECC bit error.

4. The information handling system of claim 1, wherein in mitigating the errors on the first DRAM device, the memory controller is further configured to:
lower a first data transaction rate between the memory controller and the first DRAM device on the first memory channel, and maintain a second data transaction rate between the memory controller and the second DRAM device at a constant rate.

5. The information handling system of claim 1, wherein in mitigating the errors on the first DRAM device, the memory controller is further configured to:
isolate the first memory channel, and maintain the second memory channel as active.

6. The information handling system of claim 5, wherein in isolating the first memory channel, the memory controller is further configure to:
read data stored on the first DRAM device;
store the data from the first DRAM device to another memory device of the information handling system; and
remap the data from the first DRAM device to the other memory device.

7. The information handling system of claim 1, wherein in mitigating the errors on the first DRAM device, the memory controller is further configured to:
direct the first DRAM device to perform a Post-Package Repair on a row of the DRAM device associated with the first storage location.

8. The information handling system of claim 1, wherein the first DRAM is further configured to:
receive an Error Correcting Code (ECC) error rate threshold from the memory controller;
determine if the ECC bit error results in the ECC error rate threshold being exceeded; and
provide the alert signal to the memory controller in further response to determining that the ECC bit error resulted in the ECC error rate threshold being exceeded.

9. The information handling system of claim 1, wherein:
the DIMM further includes a third DRAM device coupled to the first memory channel and configured to:
receive a third ECC threshold from the memory controller;
detect a second ECC bit error for a data transaction within the third DRAM device;
determine if the second ECC bit error results in the third ECC error threshold being exceeded; and
provide the alert signal to the memory controller in response to determining that the second ECC bit error resulted in the third ECC error threshold being exceeded;
wherein in response to receiving the alert signal from the third DRAM device, the memory controller is further configured to:
retrieve second correlation information from the third DRAM device, wherein the second correlation information includes a second storage location associated with the second ECC bit error; and
mitigate errors on the third DRAM device based upon the second correlation information.

10. A method, comprising:
receiving, by a first Dynamic Random Access Memory (DRAM) device of a dual-channel Dual In-Line Memory Module (DIMM), a first Error Correcting Code (ECC) error threshold from a memory controller, wherein the first DRAM device is coupled to the memory controller via a first memory channel;
receiving, by a second DRAM device of the DIMM, a second ECC error threshold from the memory controller, wherein the second DRAM device is coupled to the memory controller via a second memory channel;
detecting, by the first DRAM device, a first ECC bit error for a data transaction within the first DRAM device;
determining if the first ECC bit error results in the first ECC error threshold being exceeded;
providing an alert signal to a memory controller coupled to the DIMM in response to determining that the first ECC bit error resulted in the first ECC error threshold being exceeded; and
retrieving, by the memory controller, first correlation information from the first DRAM device, wherein the first correlation information includes a first storage location associated with the first ECC bit error; and mitigating, by the memory controller, errors on the first DRAM device based upon the correlation information.

11. The method of claim 10, further comprising:
storing, by the first DRAM device, the first correlation information associated with the first ECC bit error.

12. The method of claim 10, wherein in mitigating the errors on the first DRAM device, the method further comprises:
lowering, by the memory controller, a first data transaction rate between the memory controller and the first DRAM device on the first memory channel; and
maintaining a second data transaction rate between the memory controller and the second DRAM device at a constant rate.

13. The method of claim 10, wherein in mitigating the errors on the first DRAM device, the method further comprises:
isolating, by the memory controller, the first memory channel; and
maintaining, by the memory controller, the second memory channel as active.

14. The method of claim 13, wherein in isolating the first memory channel, the method further comprises:
reading, by the memory controller, data stored on the first DRAM device;
storing the data from the first DRAM device to another memory device of the information handling system; and
remapping the data from the first DRAM device to the other memory device.

15. The method of claim 10, wherein in mitigating the errors on the first DRAM device, the method further comprises:
directing, by the memory controller, the first DRAM device to perform a Post-Package repair on a row of the first DRAM device associated with the first storage location.

16. The method of claim 10, further comprising:
receiving, by the first DRAM device, an ECC error rate threshold from the memory controller; and
determining if the ECC bit error results in the ECC error rate threshold being exceeded, wherein providing the alert signal to the memory controller is in further response to determining that the ECC bit error resulted in the ECC error rate threshold being exceeded.

17. The method of claim 10, further comprising:
receiving, by a third DRAM device of the DIMM, a third ECC error threshold from a memory controller, wherein the third DRAM device is coupled to the memory controller via the first memory channel;
detecting, by the third DRAM device, a second ECC bit error for a data transaction within the third DRAM device;
determining, by the third DRAM device, if the second ECC bit error results in the third ECC error threshold being exceeded;
providing, by the third DRAM device, the alert signal to the memory controller in response to determining that the second ECC bit error resulted in the third ECC error threshold being exceeded; and
retrieving, by the memory controller, second correlation information from the third DRAM device, wherein the second correlation information includes a second storage location associated with the second ECC bit error; and
mitigating, by the memory controller, errors on the third DRAM device based upon the second correlation information.

18. A dual-channel Dual In-Line Memory Module (DIMM), comprising:
a first Dynamic Random Access Memory (DRAM) device coupled to a memory controller via a first memory channel;
a second DRAM device coupled to the memory controller via a second memory channel; and
a register control device configured to:
receive a memory transaction on the first memory channel; and
provide a control output to the first DRAM device to execute the memory transaction;
wherein the first DRAM device is configured to:
receive a first Error Correcting Code (ECC) error threshold from the memory controller;
detect an ECC bit error for a data transaction within the first DRAM device;
determine if the ECC bit error results in the first ECC error threshold being exceeded;
provide an alert signal to the memory controller in response to determining that the ECC bit error resulted in the first ECC error threshold being exceeded; and
receive a first command from the memory controller to mitigate errors on the first DRAM device; and
wherein the second DRAM device is configured to receive a second ECC error threshold from the memory controller.

19. The dual-channel DIMM of claim 18, wherein the first DRAM device is further configured to:
receive, an ECC error rate threshold from the memory controller; and
determine if the ECC bit error results in the ECC error rate threshold being exceeded, wherein providing the alert signal to the memory controller is in further response to determining that the ECC bit error resulted in the ECC error rate threshold being exceeded.

20. The dual-channel DIMM of claim 18, further comprising:
a third DRAM device coupled to the memory controller via the first memory channel;
a second DRAM device coupled to the memory controller via a second memory channel, and configured to:
receive a third ECC error threshold from the memory controller;
detect a second ECC bit error for a data transaction within the third DRAM device;
determine if the second ECC bit error results in the third ECC error threshold being exceeded;
provide the alert signal to the memory controller in response to determining that the second ECC bit error resulted in the third ECC error threshold being exceeded; and
receive a second command to mitigate errors on the third DRAM device.

* * * * *